(12) United States Patent
Braun et al.

(10) Patent No.: US 8,064,100 B2
(45) Date of Patent: Nov. 22, 2011

(54) WATERMARK ENCODING AND DETECTION USING NARROW BAND ILLUMINATION

(75) Inventors: Karen M. Braun, Fairport, NY (US); Raja Bala, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 545 days.

(21) Appl. No.: 12/329,082

(22) Filed: Dec. 5, 2008

(65) Prior Publication Data

US 2010/0142003 A1 Jun. 10, 2010

(51) Int. Cl.
*H04N 1/44* (2006.01)
*H04N 1/52* (2006.01)
*H04N 1/56* (2006.01)
*G06K 15/02* (2006.01)
*B41M 3/10* (2006.01)
*G07D 7/12* (2006.01)

(52) U.S. Cl. ....... 358/1.9; 358/3.28; 358/3.06; 358/509; 358/518; 358/534; 283/85; 283/113; 283/902; 235/468

(58) Field of Classification Search .................. 358/1.9, 358/3.28, 509, 518, 3.06, 534; 382/100, 382/135, 162, 167, 190, 191; 235/468, 491; 283/85, 88, 92, 113, 902; 340/5.86; 356/51; 347/107; 399/366

See application file for complete search history.

(56) References Cited

U.S. PATENT DOCUMENTS

| | | | |
|---|---|---|---|
| 7,800,785 B2 * | 9/2010 | Bala et al. | 358/3.28 |
| 2007/0262579 A1 * | 11/2007 | Bala et al. | 283/92 |
| 2008/0302263 A1 * | 12/2008 | Eschbach et al. | 356/51 |
| 2008/0305444 A1 * | 12/2008 | Eschbach et al. | 430/495.1 |
| 2009/0237682 A1 * | 9/2009 | Bala et al. | 358/1.9 |
| 2010/0142003 A1 * | 6/2010 | Braun et al. | 358/3.28 |
| 2011/0052888 A1 * | 3/2011 | Eschbach et al. | 427/145 |

* cited by examiner

*Primary Examiner* — Scott A Rogers
(74) *Attorney, Agent, or Firm* — Fay Sharpe LLP

(57) ABSTRACT

A system is employed to reveal a watermark in a document. A watermark generator is utilized to select the placement and at least one colorant combination of an image and at least one colorant combination for a watermark on a document, where the at least one colorant combination of the image and the watermark form a metameric pair. A printing system receives data from the watermark generator and places the image and the watermark on the document. A decoder comprising a narrow band illumination element is selected or tuned to a wavelength corresponding to the colorant combinations utilized by the printing system to reveal the watermark placed thereon.

20 Claims, 13 Drawing Sheets

US 8,064,100 B2

WATERMARK ENCODING AND DETECTION USING NARROW BAND ILLUMINATION

BACKGROUND

The present disclosure broadly relates to watermarking documents and, more particularly, to providing a cost effective way to encode and decode such watermarks. Printing systems can print documents utilizing CMYK colorants, wherein metameric colorant combinations are selected to print watermarks. The watermarks can be subsequently decoded via narrow band illumination. It is to be appreciated, however, that the exemplary embodiments are also amendable to other like applications.

Digital watermarking is the process of embedding information into a digital signal. The signal may be audio, pictures or video, for example. In visible digital watermarking, the information can be presented via a picture, video and/or hardcopy image. In one example, a watermark is sent along with print data to a printing system for placement on a hard copy document. In another example, television broadcast data is transmitted to include a logo displayed on top of the standard broadcast content.

Additional processing can be required to decode a watermark. For a hardcopy document, exposure to particular light sources can enhance discrimination between colorants to expose and decode the watermark. Special inks that have infrared (IR) or ultraviolet (UV) properties can make watermarks invisible in white light and visible under special lights. In one technique, a substrate with fluorescent brighteners is used to embed information wherein brighteners are selectively blocked using readily-available colorants.

Techniques such as modifying halftones and variable black (K) colorant usage can also be employed to print watermarks via hardcopy. Decoding these watermarks can require specialized IR cameras, UV illumination and/or paper fluorescence. Watermark decoding can further be dependent on custom ink processing and placement that can be unreliable. Unfortunately, these methods can be undesirable as they are relatively complex and expensive to implement.

What are needed are cost effective systems and methods to encode and decode watermarks.

BRIEF DESCRIPTION

In one aspect, a system reveals a watermark in a document. A watermark generator selects the placement and at least one colorant combination of an image and at least one colorant combination for a watermark on a document, where the at least one colorant combination of the image and the watermark form a metameric pair. A printing system receives data from the watermark generator and places the image and the watermark on the document. A decoder comprising a narrow band illumination element is selected or tuned to a wavelength corresponding to the colorant combinations utilized by the printing system to reveal the watermark placed thereon.

In another aspect, a method is employed to decode a printed watermark. At least one colorant combination of an image and at least one colorant combination for a watermark on a document are derived, where the at least one colorant combination of the image and the watermark form a metameric pair. A visible narrow band illumination is selected whose spectral power distribution maximizes the visual distinction between the image and the document. The visible narrow band illumination is utilized to decode a printed watermark generated from the image.

In yet another aspect, a method is employed to generate a printed watermark. At least one colorant mixture/pattern is selected for printing. A second colorant mixture/pattern is derived with the property of appearing substantially similar to the first mixture/pattern under broadband (white) illumination, but distinct from the first mixture/pattern under a selected visible narrowband illumination. The two colorant mixtures/patterns are printed in close spatial proximity to produce a watermark that is concealed under white illumination and revealed under the visible narrowband illumination.

DETAILED DESCRIPTION

Figure 1:
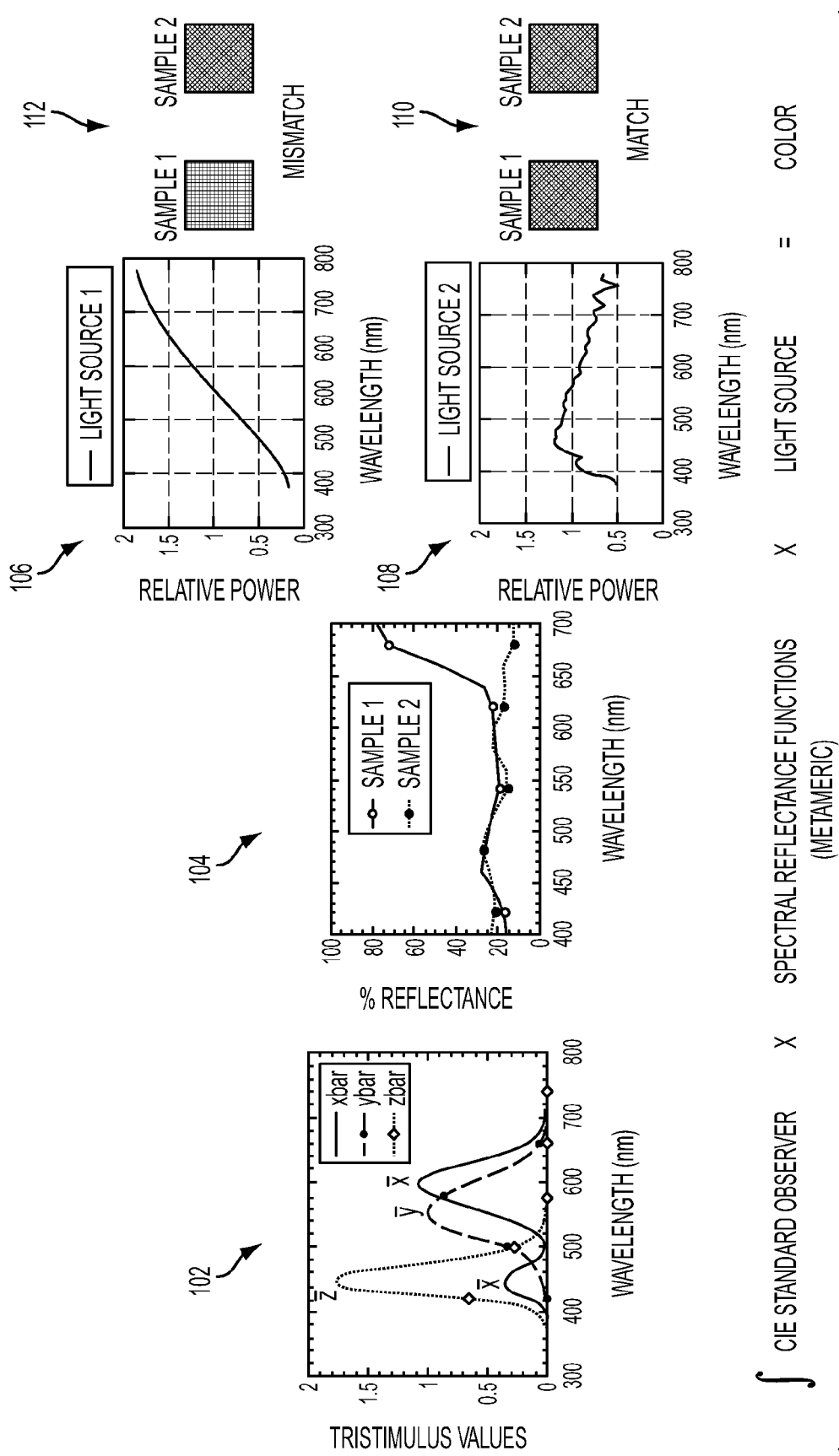
FIG. 1 illustrates color perception of a metameric pair based on a standard observer within the CIE color space, in accordance with an exemplary embodiment.

The current embodiment relates to selecting narrow-band illumination to reveal information hidden by metameric-based rendering techniques. In this disclosure, the term "narrow-band illumination" refers to illumination whose power spectral distribution is concentrated within a limited part of the visible electromagnetic spectrum, and negligible in the remaining parts of the visible spectrum. This contrasts with "broad-band" illumination which emits considerable power across most or the entire visible spectrum. Metameric-based embedding techniques result in different spectral reflectance functions for the same desired color. As utilized herein, the term color refers to visual sensation of color stimulus, or the perception of color. In measurement terms, this refers to the colorimetric value as opposed to spectral reflectance. FIG. 1 illustrates color perception based on a standard observer within the CIE color space. A plot 102 illustrates a color matching function of an International Commission on Illumination (CIE) standard observer.

The typical human eye has three types of cells, called cones, for detecting light and color under normal viewing conditions. The three types of cone cells correspond to detecting short (S), middle (M), and long (L) wavelengths. Thus, in principle, only three parameters are necessary to describe a color sensation. The spectrum from a surface color can be referred to as multiplication of a spectral reflectance function (SRF) of the surface and a spectral power distribution (SPD) of the light source illuminating the surface. Multiplying this product by the spectral sensitivities of the three cone cells results in three values being presented to the brain which represent the perceived color, and thus color is three-dimensional. These relationships are true for color normal observers and do not generally apply to color deficient observers.

Tristimulus values of a color are the amounts of three primary colors in a three-component additive color model needed to match a test color. The tristimulus values are denoted X, Y, and Z. Two colored regions, made up of different mixtures of various wavelengths, may appear to be the same color; this effect is called metamerism. Two colored regions have the same apparent color to an observer when they have the same tristimulus values under different light sources, no matter what spectral distributions were used to produce them. Two such colored regions are known as metamers or a metameric pair.

Due to the nature of the distribution of cones in the eye, the tristimulus values depend on the observer's field of view. To eliminate this variable, the standard observer is employed and is characterized by three color matching functions. The color matching functions are the numerical description of the chromatic response of the observer, as described above. A set of three color-matching functions, called $\bar{x}(\lambda)$, $\bar{y}(\lambda)$, and $\bar{z}(\lambda)$, are set forth in the plot 102. These color matching functions represent spectral sensitivity curves of three linear light detectors that yield the tristimulus values X, Y, and Z. The tabulated numerical values of these functions are known collectively as the CIE standard observer.

The tristimulus values for a color with a spectral power distribution $I(\lambda)$ are given in terms of the standard observer by:

$$X = \int_0^\infty I(\lambda)\bar{x}(\lambda)d\lambda \quad (1)$$

$$Y = \int_0^\infty I(\lambda)\bar{y}(\lambda)d\lambda \quad (2)$$

$$Z = \int_0^\infty I(\lambda)\bar{z}(\lambda)d\lambda \quad (3)$$

where $\lambda$ is the wavelength of electromagnetic radiation (typically measured in nanometers).

A plot 104 shows spectral reflectance functions (SRF) for a sample 1 and a sample 2. The spectral reflectance for both samples is about twenty percent from about 400-650 nm. From about 650-700 nm, however, the reflectance of sample 1 rises sharply to about eighty percent reflectance. Within this same bandwidth, the reflectance of sample 2 remains the same. Regardless of this disparity, the multiplication and integration of the different spectra for sample 1 and sample 2 by the same detector spectral response can give the same value. As sample 1 and sample 2 appear the same for two SRFs, a particular SPD, and all three cones, sample 1 and sample 2 are metamers.

A first light source and a second light source can be used to illuminate the samples 1 and 2. The first and second light sources have SPDs 106 and 108 respectively. The SPD 106 of the first light source has a highest relative power output from 600-800 nm. The SPD 108 of the second light source has the greatest relative power output between around 400-500 nm. The second light source does not produce observable color discrimination between the sample 1 and the sample 2, as shown in a color match 110. Color discrimination is not realized since the second light source has an SPD with very little power where the SRFs of the samples are significantly different.

In contrast, when the first light source is employed, an observable color difference is obtained between the sample 1 and the sample 2 metamers. This disparity is shown as a color mismatch 112 and is a result of the first light source having an SPD with significant power where the SRFs of the samples are significantly different. The selection of a proper narrow band illumination creates discrimination between metameric colors. Thus, the bandwidth of an illuminant to create color discrimination can directly depend on colorants employed to print respective samples.

Narrow-band light sources are utilized to highlight or accentuate spectral reflectance differences. In one example, a watermark is revealed only when illuminated via an appropriate narrow band light source. Optimization can be employed to design an illumination source to accentuate a given metameric pair (a document and a watermark), or the metameric pair and illumination source can be jointly optimized to provide desirable properties in both wideband and narrow band illumination. An embodiment uses color light-emitting diodes (LEDs) as a type of narrow band illumination. Such devices are advantageous as they are inexpensive and commercially available for a large set of peak wavelengths within the visible spectrum.

Within the CMY color space (e.g., in four-color printing), any hue angle can be achieved by combining two of the three primary colors. The purpose of the third color is to move the hue towards grey (e.g., decrease saturation), and is known as the greying agent. However, as that greying agent has an inherent hue of its own, it also shifts the hue as it changes the saturation of the resulting color. The most efficient way to change the saturation of a given color while maintaining the same hue angle is to use the K (Black) component. The act of substituting a quantity of black for a quantity of the greying agent is known as grey component replacement (GCR).

A watermark can be created via a choice of differing GCR strategies within an image upon which it is placed. This disparity can result in two different spectral reflectance functions (SRFs) for a given target color that are calculated to match for a given light source or illuminant (e.g., CIE D50, D55, D65, etc.). When a light source is different from the given light source or illuminant, however, the match will likely not hold exactly. The effect is quite subtle for most white light sources. However, if the light source is carefully selected to have its power in the regions of the spectrum where the two SRFs have maximum difference, a color difference between them can be readily seen. This desired discrimination necessitates selecting illumination SPDs to cause high degree of color mismatch between two otherwise matching samples.

It is to be appreciated, however, that the metameric pairs can be created ways other than varying the GCR strategy, and that the present technique is suitable for decoding any method of embedding that relies on the use of metamers to hide information in an image. In another approach, additional colorants can be used such as extended gamut colorants (e.g., orange, red, green, purple, violet) and photo tone colorants (e.g., light cyan, light magenta, light black, dark yellow). The subject embodiments can be employed with substantially any application including extended gamut applications and/or with disparate colorants.

Figure 2:
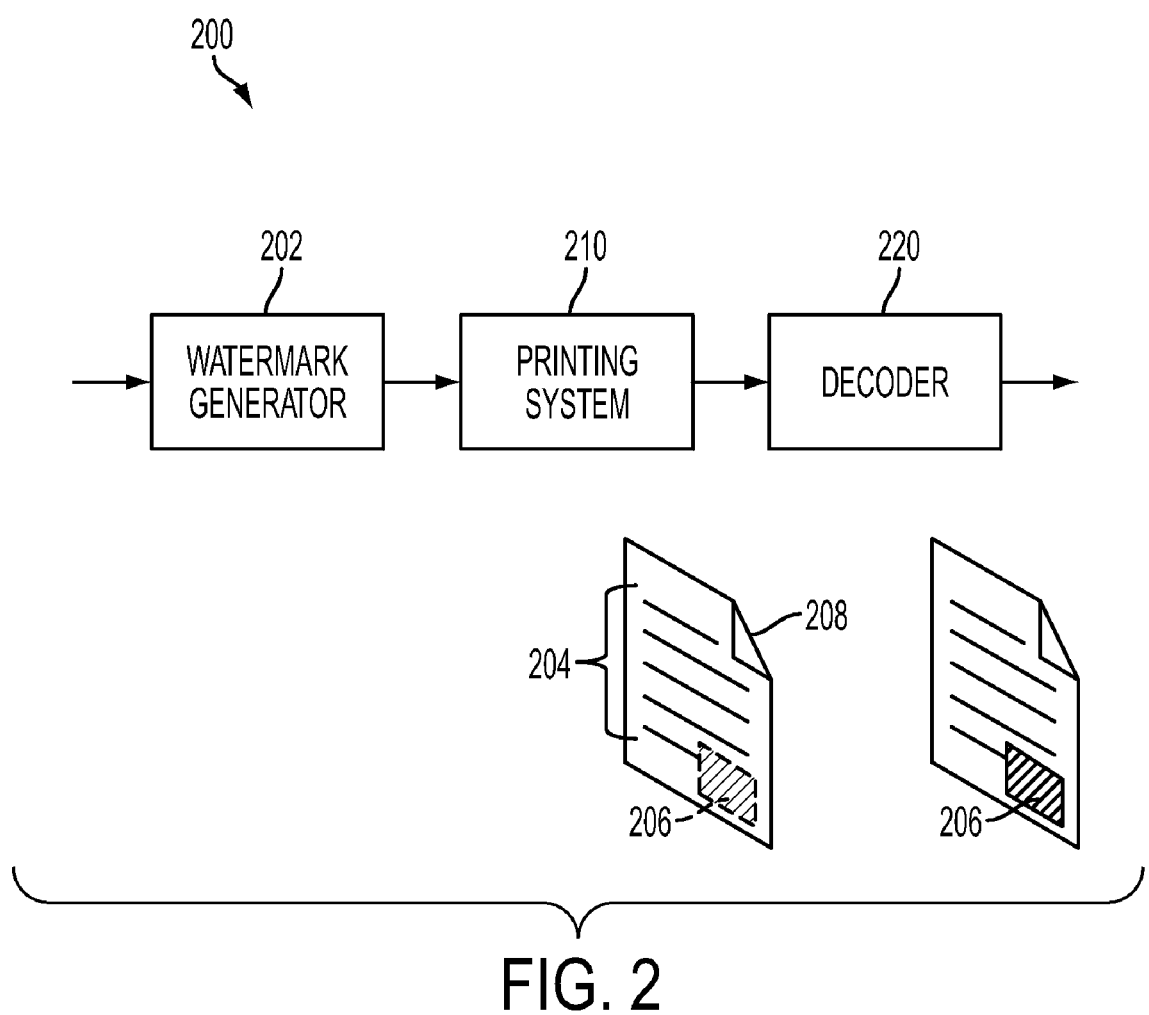
FIG. 2 illustrates a system to decode via a decoder a watermark placed on a document, in accordance with an exemplary embodiment.

FIG. 2 is a system 200 that utilizes a decoder to decode a watermark placed on an image. An watermark generator 202 is employed to create a print job that includes an image 204 and a watermark 206 for placement thereon. A printing system 210 places the image 204 and the watermark 206 on a document 208 based on data received from the watermark generator 202. In one example, the colorant combination of the watermark at a given image location 206 is a metamer of the image 204 colorant combination at that location. Finally, a decoder 220 reveals the watermark 206 by discriminating the colorant combinations employed by the printing system 210.

In general, if the watermark is being placed within an image with varying colors, as in common photographs, each spatial position in the image has a particular target color and can be rendered with one of at least two metameric pairs that produce that color. The presence or absence of the watermark at that pixel location determines which of the pair of metamers is used to render that target color.

In one embodiment, the watermark generator 102 is a computer that supports the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The watermark generator 102 can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The watermark generator 102 can further include a hard disk drive, a magnetic disk drive, e.g., to read from or write to a removable disk, and an optical disk drive, e.g., for reading a CD-ROM disk or to read from or write to other optical media. The watermark generator 102 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the watermark generator 102.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the watermark generator 102 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc. A monitor (e.g., the display 116), or other type of display device, is also connected to the system bus via an interface, such as a video adapter (not shown). In addition to the monitor, a computer typically includes other peripheral output devices (not shown), such as speakers, printers etc.

A display can be employed with the watermark generator 102 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the watermark generator 102 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device.

It will be appreciated that network connections described herein are exemplary and other means of establishing a communications link between the computers may be used.

In one example a device driver (not shown) allows the watermark generator 202 to interface to the printing system 210. The device driver can act as a translator between the printing system 210 and the applications or operating systems employed by the watermark generator 202. In this manner, higher-level code can be written independently of the specific model of printing system 210. The device driver can convert general input/output instructions of the watermark generator 202 to specialized messages for consumption by the printing system 210.

In addition, the watermark generator 202 can run a software program to invoke a routine in the driver, wherein the driver issues commands to the printing system 210. Once the printing system 210 sends data back to the driver, the driver may invoke routines in the original calling program. The driver can also provide interrupt handling required for an asynchronous time-dependent hardware interface to the printing system 210.

The protocols and standards for communication can vary in association with the type of printing system 210 and watermark generator 202. In one example, each version of the printing system 210 can require unique specialized commands. Software applications run by the watermark generator 202 can access the printing system 210 by using high-level, generic commands, such as PRINTLN. Such generic statements can be converted into the low-level commands required by the printing system 210.

The printing system 210 is representative of one or more devices that can output an image onto a substrate. In one example, the printing system 210 is a printer such as a toner-based printer, a liquid ink jet printer, a solid ink printer, a dye-sublimation printer and an inkless printer. In one embodiment, the printing system 210 is a toner-based laser printer that utilizes xerography to output documents. Toner is adhered to a light-sensitive print drum, wherein static electricity transfers the toner to a printing medium to which it is fused via heat and pressure. In another embodiment, the printing system 210 is an LED printer which uses an array of LEDs instead of a laser to cause toner adhesion to a print drum.

The printing system 210 can also be a solid ink printer. Solid ink printers employ solid sticks of cyan (C), magenta (M), yellow (Y) and black (K) colored ink, which are melted and fed into a piezo crystal operated print head. The print head sprays the ink on a rotating, oil coated drum. The paper then passes over the print drum, at which time the image is transferred, or transfixed, to the page. In yet another embodiment, the printing system 210 is a dye-sublimation printer that uses heat to transfer dye to a medium such as a plastic card, paper or canvas. The process generally lays one color at a time using a ribbon that has color panels. Dye-sublimation printers are intended primarily for high-quality color applications, including color photography.

In another approach, the printing system 210 is an inkless printer that uses paper with colorless dye crystals embedded between two outer layers of paper. When an imaging element within the printer is turned on, varying heat from the imaging element causes the crystals to colorize at different rates and become visible. Another inkless printer approach utilizes a reusable paper coated with a few micrometers of UV light sensitive chemicals. The printer employs a UV light bar that writes and erases the paper.

The printing system 210 can receive data from the watermark generator 202 to produce a document 208 that includes an image 204 and a watermark 206. Particular colorant combinations can be specified for both the image 204 and the watermark 206 of the document 208. The colorant combinations produce metameric matches. This configuration can be advantageous to prevent a watermark from revelation unless a specific light bandwidth is utilized to illuminate the document 208.

It is to be appreciated that color matches obtained by metameric pairs can be sensitive to printer calibration and drift, illumination changes, and/or observer differences. Thus, in the encoding process, a masking texture might be used by the printing system 210, or GCRs might be used that are not extremely different. Also, the printing system 210 can place metamers via a fixed halftoning scheme and searching for pairs in contone CMYK space. In one embodiment, binary dot patterns that exhibit the metameric property, but that do not necessarily arise from a single halftoning scheme, are derived directly. Finally, certain areas of images can facilitate hiding watermark information. In one example, the printing system 210 can ascertain one or more preferred image locations for placing watermark information.

The watermark 206 can be placed within the image 204 to conceal such location or existence thereof. The watermark 206 is presented in a dashed line as it is not visible under a standard white light source. Once the document 208 is exposed to the decoder 220, however, the watermark 206 is revealed. The wavelength and/or bandwidth of the light emitted from the decoder 220 can be selected from any number of commercially available light sources to reveal substantially any colorant combination metamers. Alternately, the wavelength and/or bandwidth of the light emitted from the decoder 220 can be adjusted to reveal substantially any colorant combination. A tuner (not shown) coupled to the decoder 220 can be utilized for this purpose.

In one example, the decoder 220 is a narrow band illumination element such as a light emitting diode (LED) that emits light within the visible light spectrum (e.g., between 400-700 nm). Unlike incandescent, fluorescent and high intensity discharge sources, LEDs are near-monochromatic light sources. An individual LED emits light in a specific wavelength and is comparatively efficient for narrow band light applications. Table 1 illustrates exemplary LEDs and their respective wavelength of emission. In one example, one or more LED types are included in the decoder 220 to accommodate a wide array of metamer colorant pairs.

TABLE 1

| Color Name | Wavelength (Nanometers) | Semiconductor Composition |
| --- | --- | --- |
| Ultra Red | 660 | GaAlAs/GaAlAs |
| Super Red | 633 | AlGaInP |
| Super Orange | 612 | AlGaInP |
| Orange | 605 | GaAsP/GaP |
| Yellow | 585 | GaAsP/GaP |
| Pure Green | 555 | GaP/GaP |
| Super Blue | 470 | GaN/SiC |
| Blue Violet | 430 | GaN/SiC |
| Ultraviolet | 395 | InGaN/SiC |

In addition to LED technology, other methods exist for creating narrow band light such as lasers, interference or dichroic filters, and monochromators which create narrow band illumination using gratings or prisms.

Figure 3:
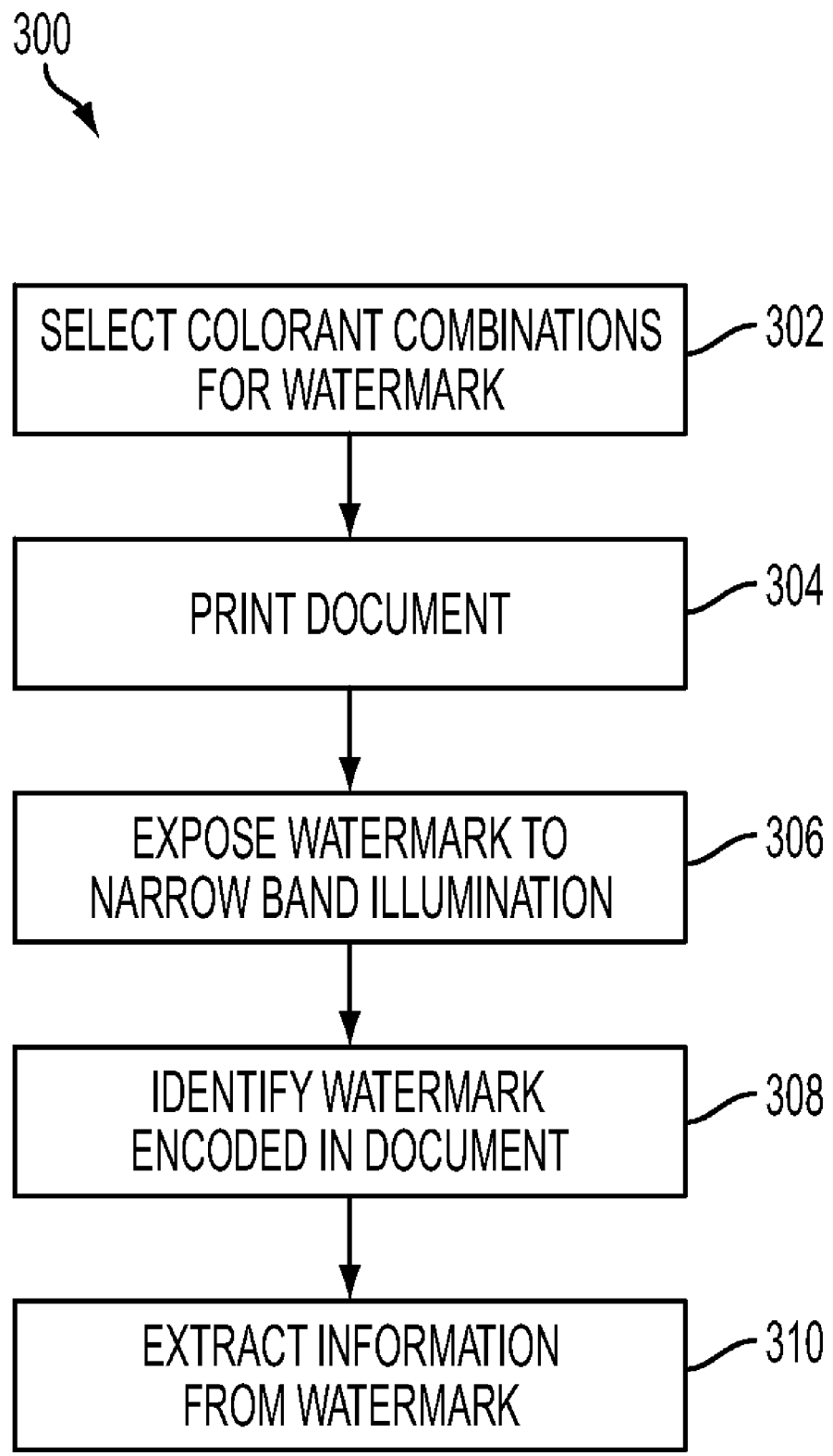
FIG. 3 illustrates a methodology to print a watermark and extract information therefrom, in accordance with an exemplary embodiment.

FIG. 3 illustrates a methodology 300 utilized to place and extract information from a watermark. At reference number 302, a colorant combination is selected for placement of a watermark. Selection of the colorant combinations can be dependent on a number of factors including matching colorants that are metameric pairs with other colorants. In one example, a metameric pair of colorants can be employed to place a watermark and an image together in a document. It should be obvious that the metameric pair of colorants may vary from one pixel in an image to the next pixel in order to maintain the appearance of the original image 204.

It is to be appreciated that although the image is referenced herein as a single color, the image can be comprised of a plurality of colors that spatially vary from one another. In such cases, the colorants selected for the watermark can vary dependent on placement of the watermark respective to the image. In one example, the image has four disparate colorant combinations within the space that the watermark is placed. The colorant combinations of the watermark can vary to form metameric pairs with each of the four image colorants, dependent on placement thereof. A decoder used to reveal the watermark can have one or more peak wavelength outputs (e.g., via a plurality of LEDs) to accommodate the various metameric pairs associated therewith.

At 304, a document is printed that utilizes the colorant combinations selected from step 302. In one example, the document is printed utilizing a four color CMYK printing system. The printing system can place the watermark with a first colorant combination into an image with a second colorant combination. The second colorant combination can vary from the first colorant combination based on a gray component replacement technique.

At 306, the watermark printed at 304 is exposed to narrow band illumination and can be emitted from a light emitting diode, in one example. The narrow band illumination is related to the colorant combinations utilized to print the image and watermark onto the document. The colorant combinations utilized for the image non-watermark region and the watermark region within the image are metamers. In this manner, the narrow band illumination reveals the watermark. In order to affect the revelation of the watermark, the narrow band illumination is adjusted to specifically differentiate metameric colorant combinations utilized for placement of the watermark. Once the watermark is exposed at 306, it is identified at 308 and information from the identified watermark is extracted at 310.

Figure 4:
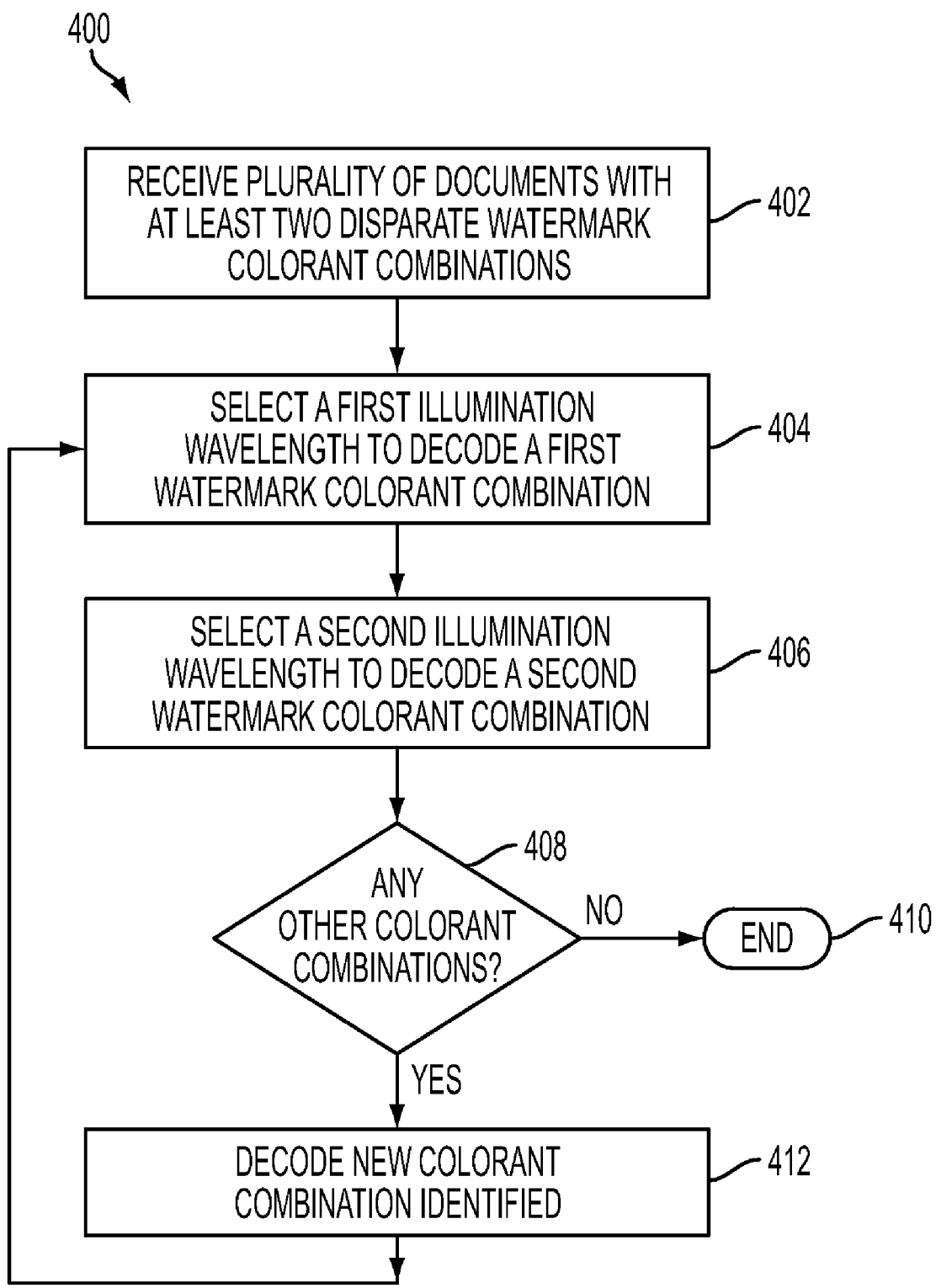
FIG. 4 illustrates a methodology to decode a plurality of colorant combinations via disparate illumination wavelengths, in accordance with an exemplary embodiment.

FIG. 4 illustrates a methodology 400 utilized to decode a plurality of watermarks placed via disparate colorant combinations. It is to be appreciated, however, that the methodology 400 could additionally be utilized for multiple watermarks on the same page, or for using multiple LEDs on different areas of the same watermark. As noted above, although the image is referenced herein as a single color, the image can be comprised of a plurality of colors that spatially vary from one another as provided in FIGS. 12 and 13. In this manner, the method 400 can be employed to decode different watermarks placed on one image regardless of the colorant combinations used for the watermark and/or the image.

At 402, a plurality of documents are received that include at least two disparate watermark colorant combinations. The watermark colorant combinations can be selected based on the colorant combination utilized for an image placed within the same document. At 404, a first illumination wavelength is selected to decode a first watermark colorant combination.

At 406, a second illumination wavelength is selected to decode a second watermark colorant combination. At 408, a query is made to determine if one or more additional colorant combinations exist. If no other colorant combinations exist, at 410, the method ends. If additional color combinations are identified, at 412, a new colorant combination is decoded via a particular illumination wavelength. The process loops back to step 404 to determine if any additional colorant combinations exist. The method continues until all disparate colorant combinations are identified and decoded via a particular illumination wavelength.

FIGS. 5-11 relate to the review and selection of various colorant combinations to utilize for placement of metameric watermarks for LED detection. To ascertain the best LEDs for detecting metameric watermarks with a printing system 210 colored patches are selected that are approximately uniformly distributed within a printer gamut (e.g. printing system 210). For each color, a metamer pair is created by finding two CMYK combinations that produce the same CIELAB value for a particular illuminant (e.g., CIE illuminant D50). Utilizing the CIE standard two degree observer, two members of a metameric pair are made with the minimum and maximum allowable K for gray color replacement respectively. The spectral reflectance functions of four example metameric pairs are illustrated in plots 500, 600, 700 and 800, respectively. The metameric spectral reflectance functions are created by printing either CMY, or a full-K calorimetric equivalent, wherein one of the colorants goes to zero. The dashed line in each of the FIGS. 5-8 is the spectral reflectance function for 0% GCR and the solid line is the spectral reflectance function for maximum-K GCR (or 100% GCR).

Considering FIGS. 5-8, the most pronounced difference between spectra occurs in similar wavelength bands. This suggests that narrow band illumination sources whose SPDs are concentrated within these bands produce optimal distinction between members of each of the four metamer pairs in this example, and possibly for a wide range of metamer pairs having colorant relationship similar to any of the four exemplary pairs. In one embodiment LEDs are used as narrow band illumination.

Figure 9:
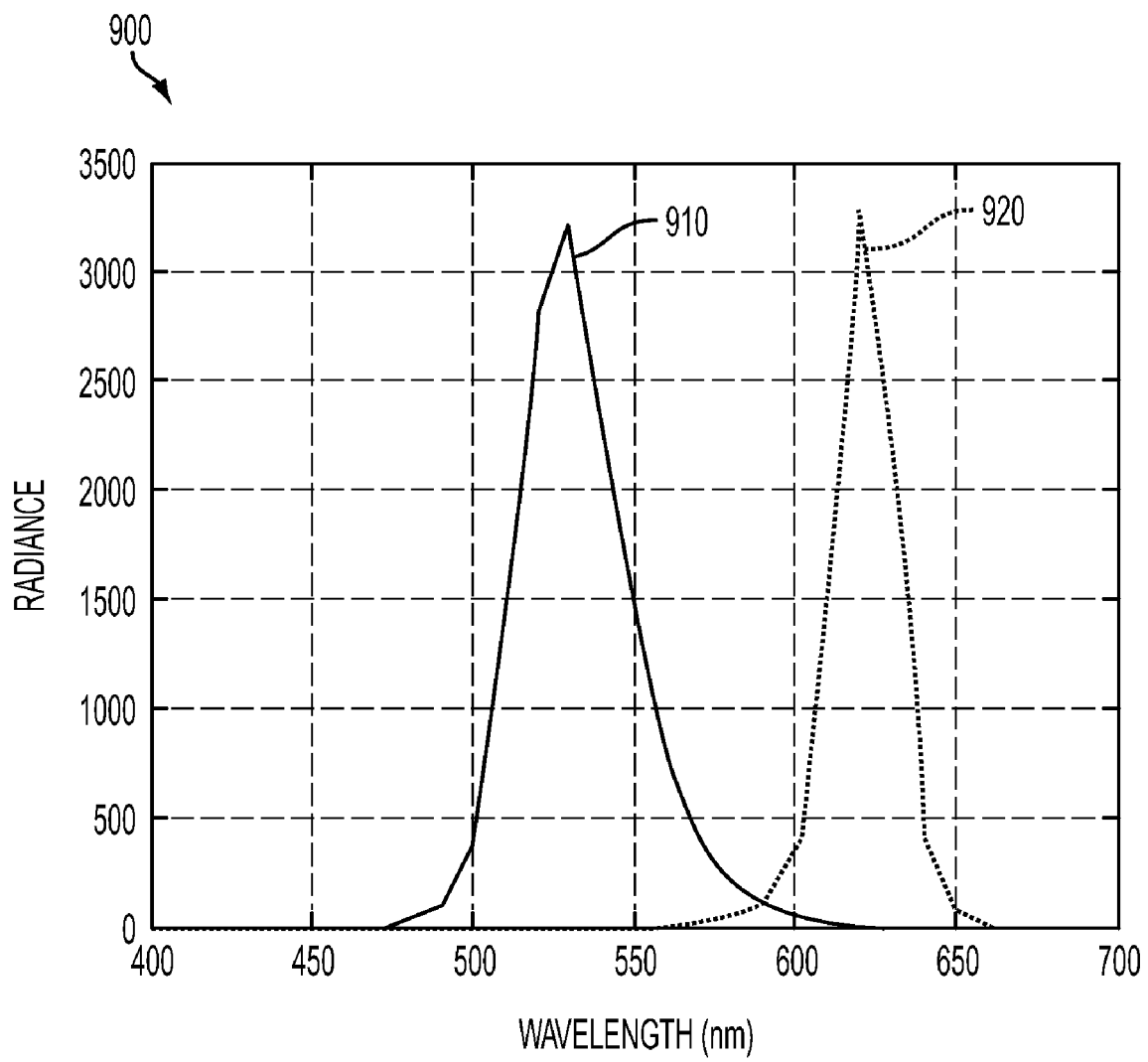
FIG. 9 illustrates spectral power distributions for LEDs with peak wavelengths at 525 nm and 620 nm, in accordance with an exemplary embodiment.

FIG. 9 illustrates typical SPDs for LEDs. A first SPD 910 has a peak wavelength of 525 nm and a second SPD 920 has a peak wavelength of 620 nm. The following analysis is performed to determine the optimum LED peak wavelengths for a given set of colorants. First, a function is defined as $D(\lambda)=R_1(\lambda)-R_2(\lambda)$, wherein $R_1$ and $R_2$ are the SRFs for a metameric reflectance pair. Next, $F(\lambda)=\int D(\lambda')V(\lambda')L(\lambda-\lambda')d\lambda'$ where $V(\lambda)$ is the photopic luminous efficiency function that describes the sensitivity of the human visual system to electromagnetic radiation at wavelength $\lambda$. $L(\lambda)$ is a function whose shape is that of a typical LED SPD, but shifted to a peak wavelength of 0. The quantity $F(\lambda)$ therefore describes the luminance difference between the metamers $R_1$ and $R_2$ when illuminated with an LED peaked at wavelength $\lambda$. It is to be appreciated that F is a signed function taking on positive values when $R_1$ is brighter than $R_2$, and vice versa.

Figure 5:
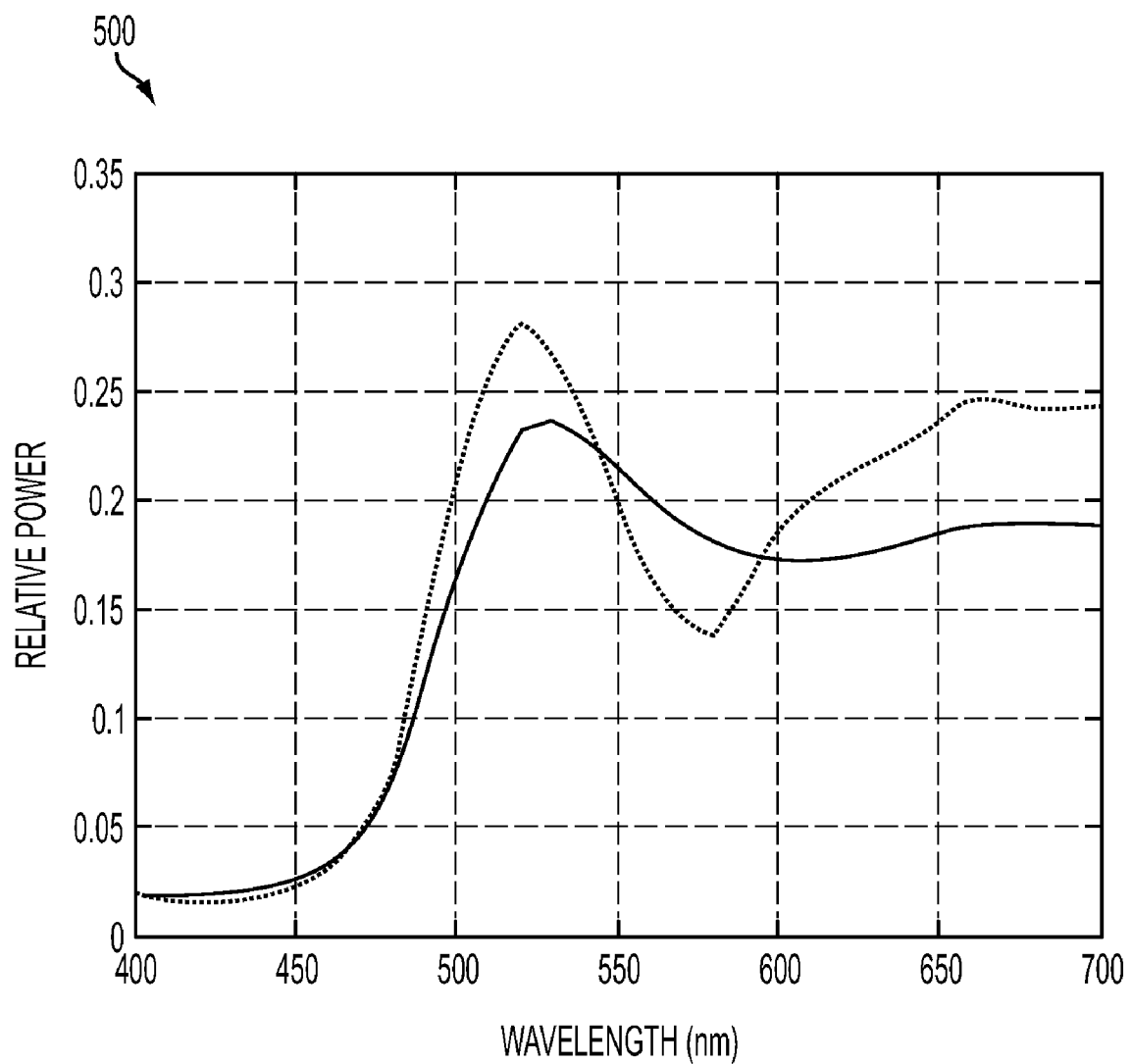
FIG. 5 illustrates a metameric spectral reflectance function for a specific metameric pair, in accordance with an exemplary embodiment.
Figure 6:
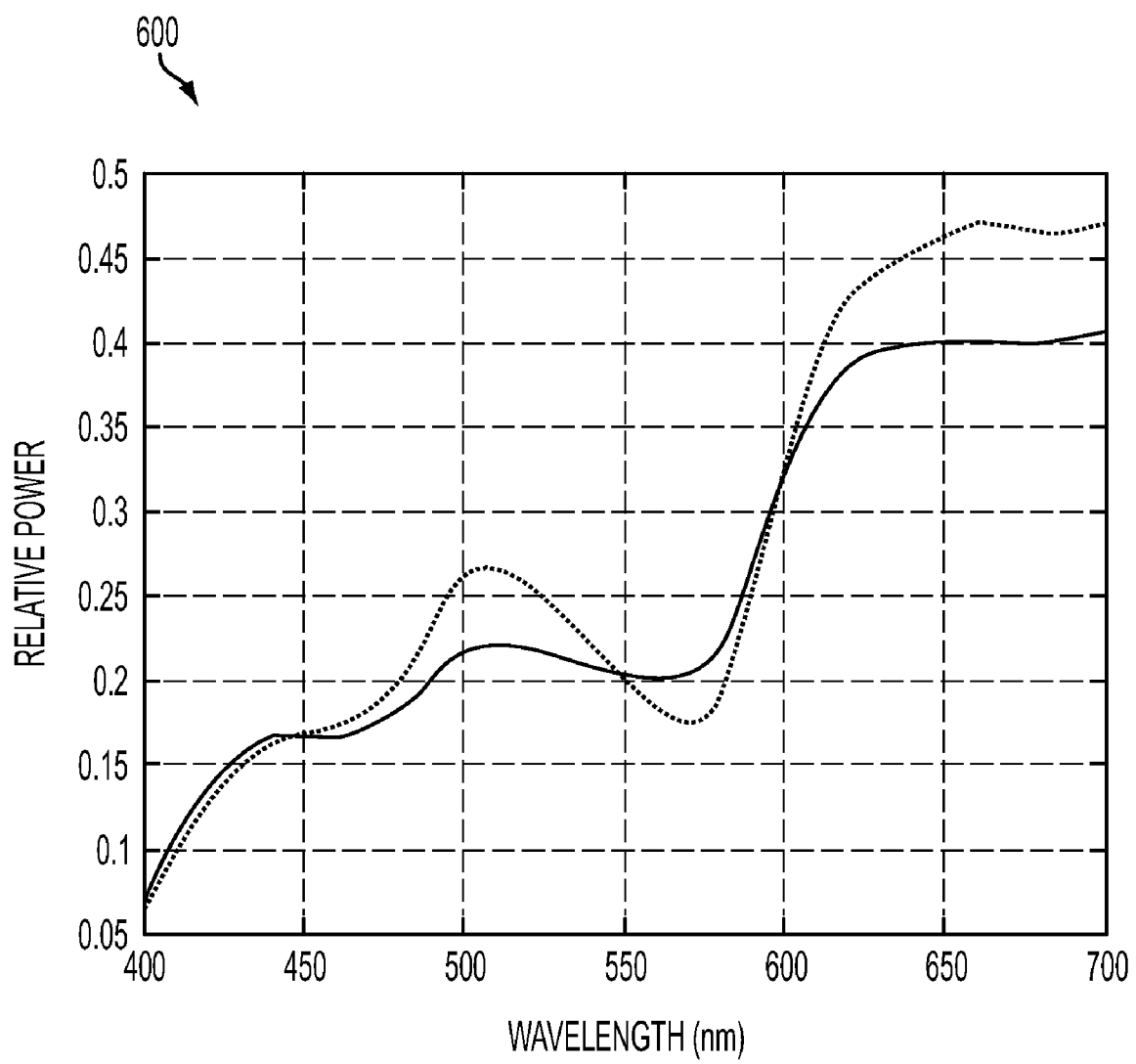
FIG. 6 illustrates a metameric spectral reflectance function for a specific metamer pair, in accordance with an exemplary embodiment.
Figure 7:
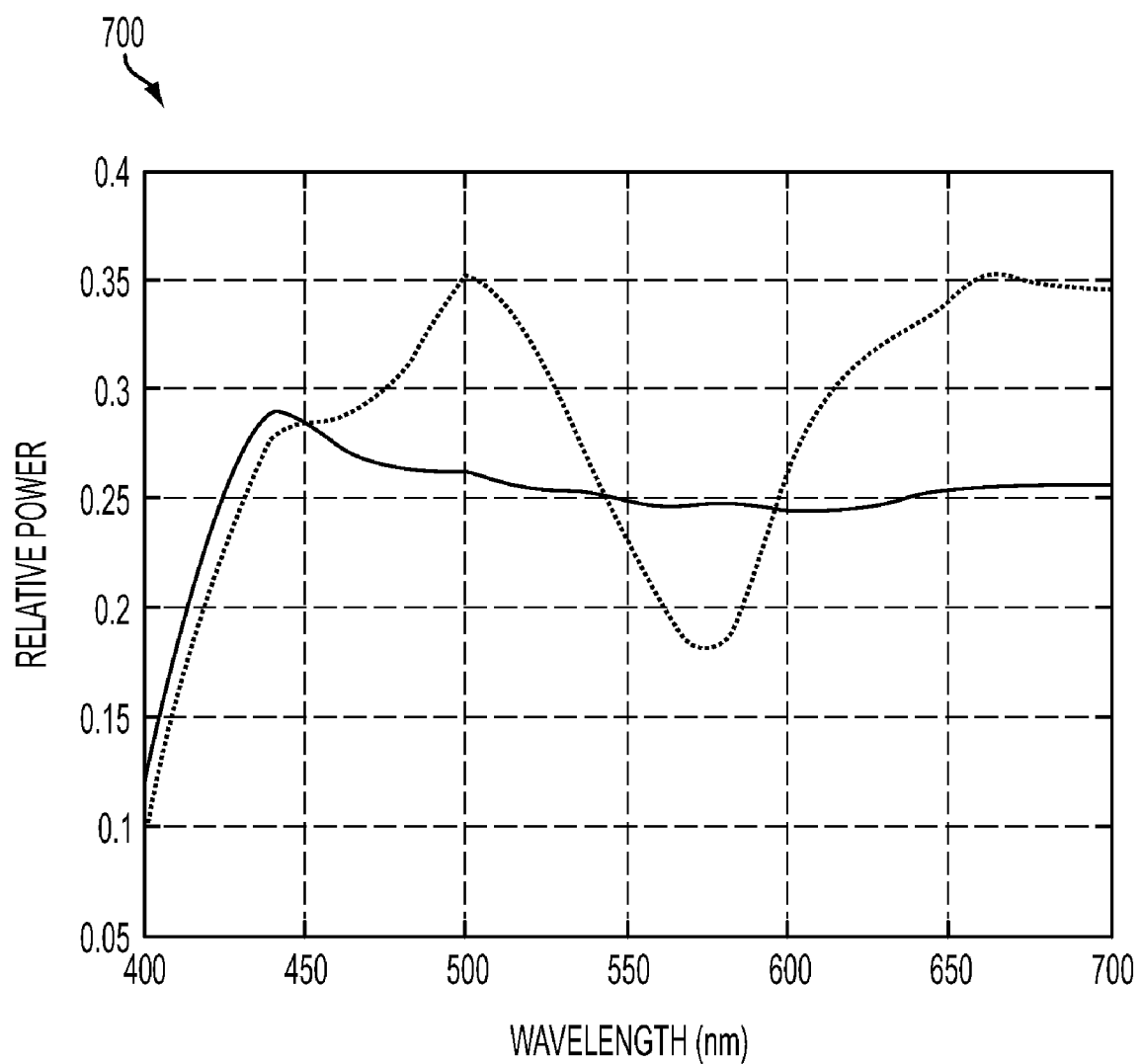
FIG. 7 illustrates a metameric spectral reflectance function for a specific metamer pair, in accordance with an exemplary embodiment.
Figure 8:
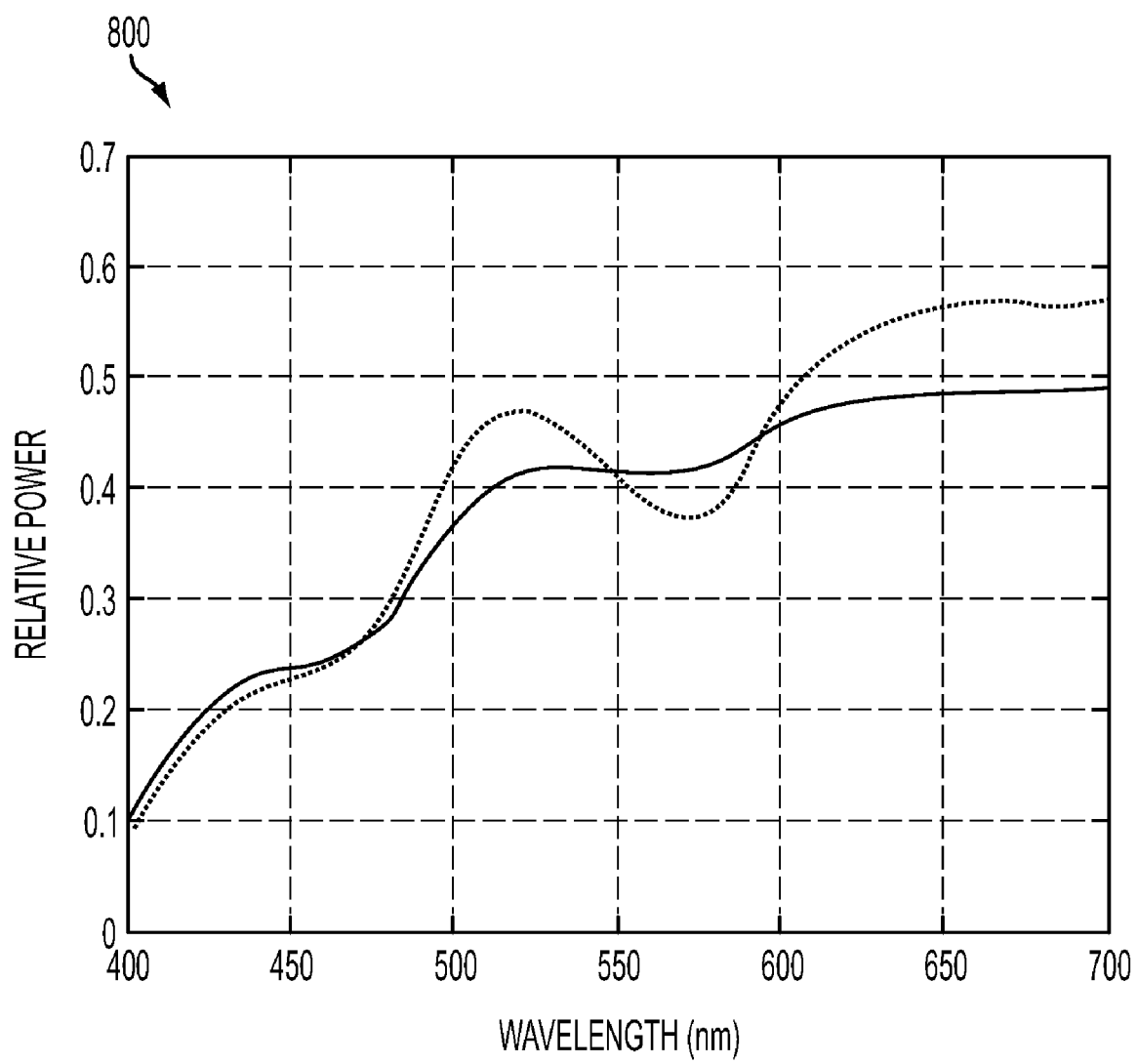
FIG. 8 illustrates a metameric spectral reflectance function for a specific metamer pair, in accordance with an exemplary embodiment.
Figure 10:
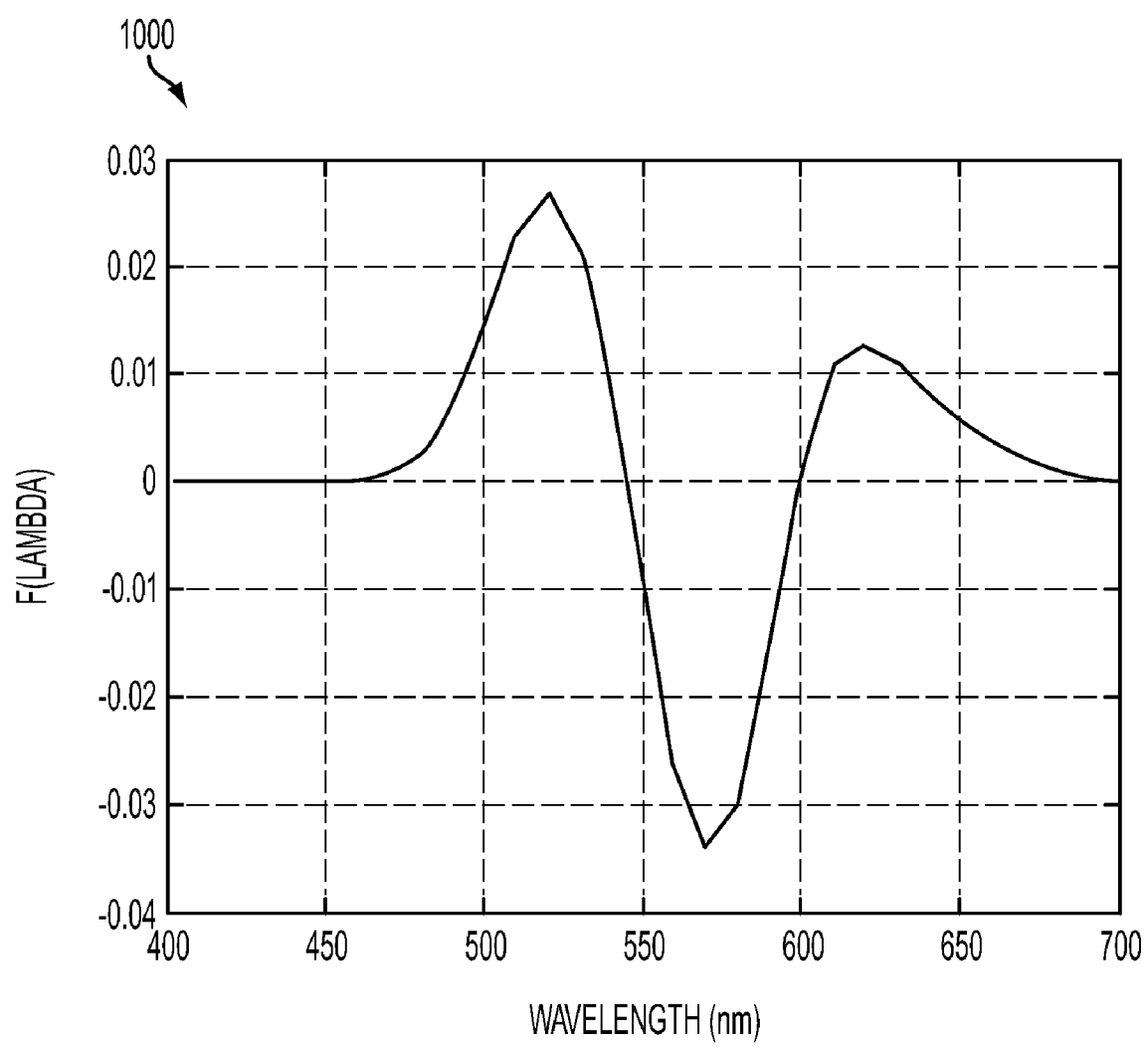
FIG. 10 illustrates spectral reflectance difference between metamers when illuminated with an LED of peak wavelength $\lambda$, in accordance with an exemplary embodiment.

FIG. 10 illustrates a plot 1000 that presents $F(\lambda)$ for the pair of metamers illustrated in FIG. 5. For this pair, F has a maxima at 520 nm and 620 nm and a minimum at 570 nm. This same analysis is repeated for all metamer pairs from FIGS. 5, 6, 7 and 8 and many additional metameric pairs wherein the wavelengths of the first two maximum peaks from FIG. 9 are collectively plotted in FIG. 11.

Figure 11:
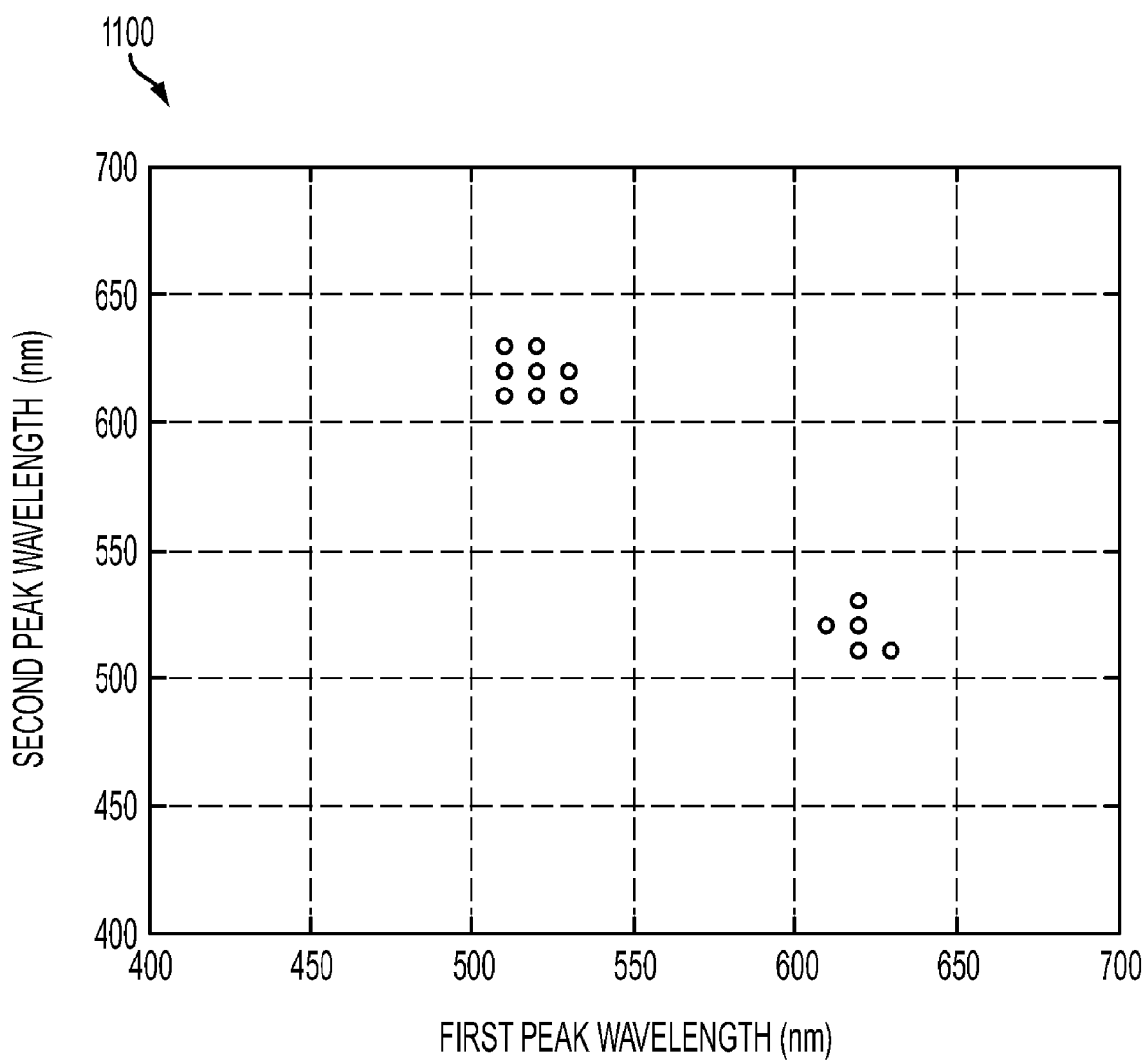
FIG. 11 is a plot of a second versus a first peak wavelength corresponding to maxima of $F(\lambda)$, in accordance with an exemplary embodiment.

FIG. 11 reveals that the two peaks are closely clustered with means calculated as 518 nm for a shorter wavelength, and 621 nm for a longer wavelength. Note the two clusters are symmetric about the y=x axis. In one embodiment, this symmetry is taken into account when computing a cluster means. It is inferred that the LEDs centered around these two wavelengths can produce the best visibility of a watermark signal made up of metameric CMYK pairs for a given printing system. Since the sign of the luminance difference at both wavelengths is of the same polarity (namely the minimum-K combination appears brighter than the maximum-K combination), Grassmann's law of additive light mixing provides that a mixture of the two LEDs at the respective peaks will produce even greater luminance distinction.

A corresponding analysis can be performed to find the minima of F and obtain wavelengths wherein the minimum-K combination appears darker than the maximum-K combination. For visual watermark detection, it can be preferable to look for peak wavelengths that produce differences of the same polarity. In another case, if the watermark is to be detected by a device such as a LED scanner, opposing polarities can be detected, and sum and difference operations can be used to maximize the strength of the decoded watermark signal.

The watermark strength for a given metamer pair ($R_1$, $R_2$) utilizing the LEDs SPDs illustrated in the plot 900 is calculated as:

Watermark strength=$|Y_1-Y_2|$, where $Y_1=\int R_1(\lambda) \times S(\lambda) \times V(\lambda) d\lambda$ $Y_2=\int R_2(\lambda) \times S(\lambda) \times V(\lambda) d\lambda$ where $R_1$ and $R_2$ are the spectral reflectances of the metameric pair, S is the spectral power distribution of the one or more LED light sources of interest, and $V(\lambda)$ is the spectral luminous efficiency function. In one example, the metamer pairs are sorted from strongest to weakest watermark strength, where watermark strength is defined under narrowband illumination, and only those pairs whose color difference under normal white (or broadband) light are less than a predetermined threshold can be selected as valid candidates for embedding a watermark signal As noted herein, an ideal metameric pair appears identical under a white light condition and in sharp contrast under a narrow band illumination source. Thus, the color difference below a predetermined threshold relates to the goal of finding a pair that is very similar under a white light source. Such similarity is in contrast to a second goal of metameric pair selection to have a high contrast, between a first colorant combination (e.g., a watermark) and a second colorant combination (e.g., an image) that form the pair, under a narrow band illumination source.

Figure 12A:
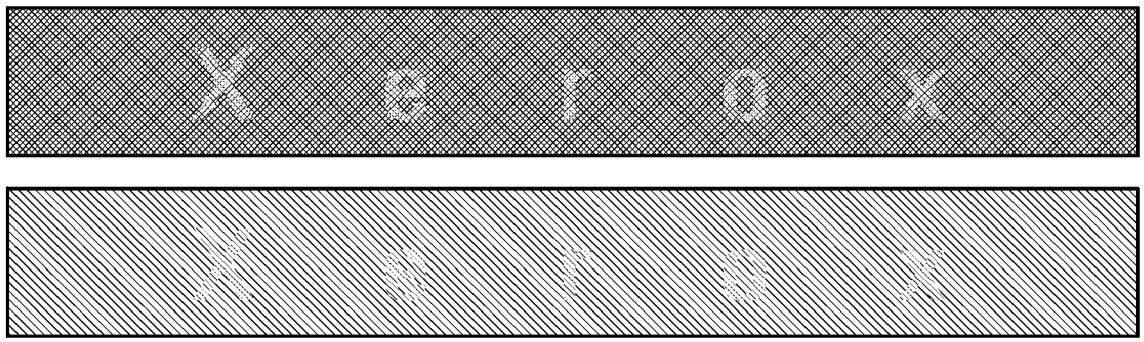
FIGS. 12A and 12B show a watermarked image viewed with daylight illumination and LED illumination, in accordance with an exemplary embodiment.
Figure 12B:
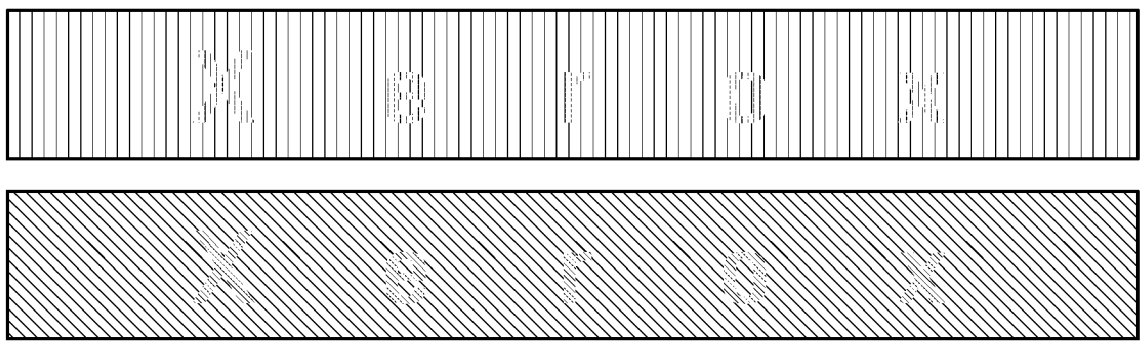
Figure 13A:
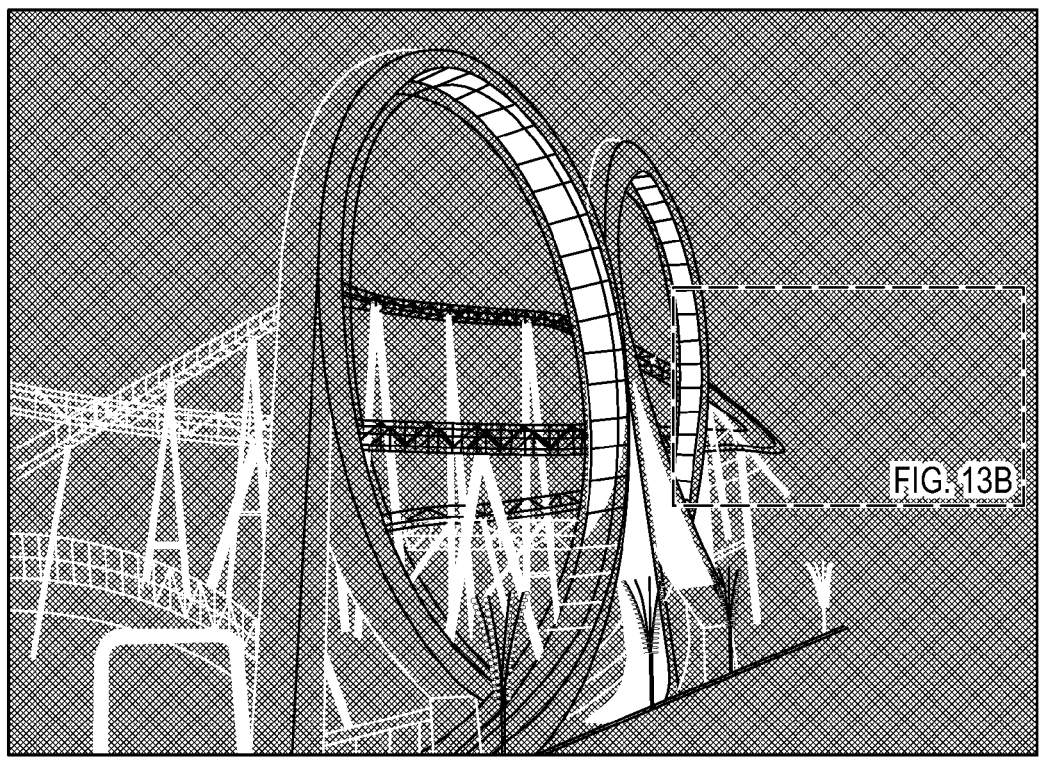
FIGS. 13A and 13B show a watermarked image viewed with daylight illumination and LED illumination, in accordance with an exemplary embodiment.
Figure 13B:
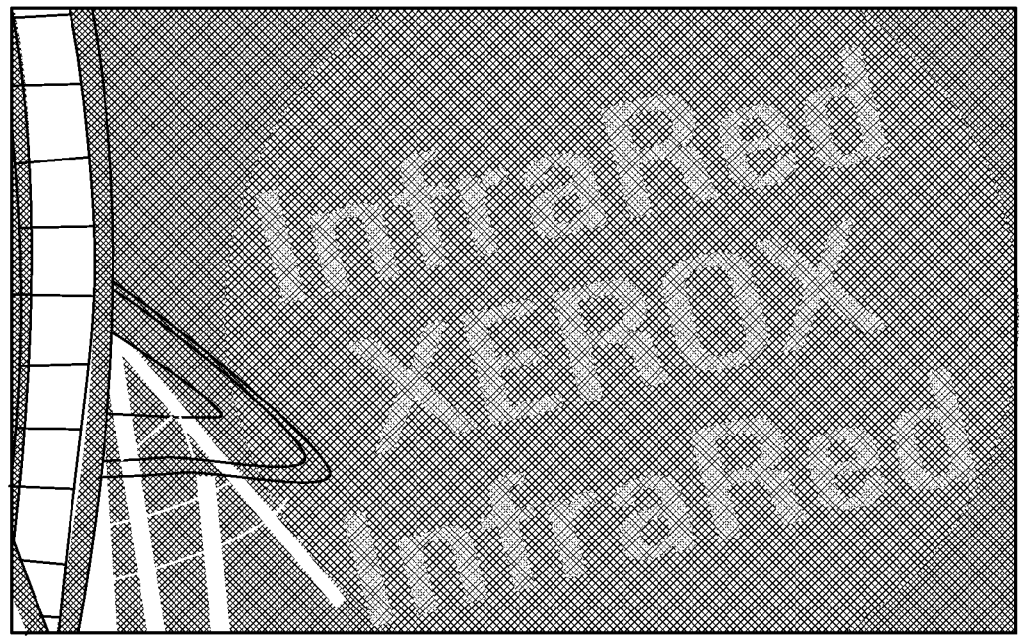

FIGS. 12 and 13 show watermarked images viewed under daylight illumination (e.g., a D65 light source), and LED illumination. The daylight illuminated sample is shown in FIGS. 12A and 13A, wherein the watermarking is not readily visible. In contrast the watermarked images illustrated in FIGS. 12B and 13B are illuminated under a red and a green light and are plainly visible. The SPDs for the red and green LEDs utilized for FIGS. 12B and 13B are illustrated in FIG. 9. In one approach, visibility under broadband illumination can be reduced via the use of distraction textures for example.

Although LEDs have been discussed for use as a detection illumination source, it is to be understood that such LEDs are not required. It is assumed that carefully selected narrow band illumination sources are best in bringing out spectral differences between metamers. However, various disparate light sources such as fluorescent light sources can also be employed as well as lasers, or light filtered with dichroic filters, prisms, or gratings, Light sources in scanners or color sensors with narrow band illumination can also be employed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system to reveal a watermark in a document, comprising:
    a watermark generator that is utilized to select the placement and at least one colorant combination of an image and at least one colorant combination for a watermark on a document, where the at least one colorant combination of the image and the watermark form a metameric pair;
    a printing system that receives data from the watermark generator and places the image and the watermark on the document; and
    a decoder comprising a narrow band illumination element that is selected or tuned to a wavelength corresponding to the colorant combinations utilized by the printing system to reveal the watermark placed thereon.

2. The system according to claim 1, wherein the narrow band illumination is at least one of a light emitting diode, a laser, a fluorescent light source, a light source filtered to be narrow band by a filter, grating, or prism.

3. The system according to claim 1, wherein the metameric pair is created by finding two CMYK combinations that produce at least a similar CIELAB value for a particular illuminant.

4. The system according to claim 1, wherein the colorant combination of one of the image and the watermark is created with the minimum allowable black (K) for gray color replacement and the colorant combination of the other of the image and the watermark is created with the maximum allowable black (K) for gray color replacement.

5. The system according to claim 1, wherein for a given set of printing colorants, the LED peak wavelength for the decoder is determined via a function $F(\lambda)=\int D(\lambda')V(\lambda')L(\lambda-\lambda')d\lambda'$, where $D(\lambda)=R_1(\lambda)-R_2(\lambda)$, $R_1$ and $R_2$ are the spectral reflectance functions for a metameric reflectance pair, $V(\lambda)$ is the photopic luminous efficiency function that describes the sensitivity of a human visual system to electromagnetic radiation at a wavelength $\lambda$, and $L(\lambda)$ is a function whose shape is that of an LED spectral power distribution shifted to a peak wavelength of 0.

6. The system according to claim 1, wherein the SPD of the illumination source is concentrated in one or more wavelength bands within which the difference between the reflectance spectra of the metameric pair is most pronounced, so as to produce optimal distinction.

7. The system according to claim 1, wherein the decoder is an image acquisition device that captures an electronic image of the document enabling the watermark to be revealed.

8. The system according to claim 1, wherein the printing system directly derives pairs of binary dot patterns that exhibit a metameric property when printed.

9. The system according to claim 8 wherein the pairs of binary dot patterns are obtained using the same halftoning scheme.

10. The system according to claim 1, wherein the printing system utilizes a masking texture when placing the image and the watermark into the document.

11. The system according to claim 1, wherein a metameric pair is created by modifying the gray component replacement of the colorant combination used to produce the watermark to be different from the gray component replacement of the colorant combination used to produce the image.

12. A method to decode a printed watermark, comprising:
    deriving at least one colorant combination of an image and at least one colorant combination for a watermark on a document, where the at least one colorant combination of the image and the watermark form a metameric pair;

selecting a visible narrow band illumination whose spectral power distribution maximizes the visual distinction between the image and the document; and, utilizing said visible narrow band illumination to decode a printed watermark generated from the image.

13. The method according to claim 12, wherein the narrow band illumination is at least one of a light emitting diode, a laser, a fluorescent light source, a light source filtered to be narrow band by a filter, grating, or prism, a scanner or a color sensor.

14. The method according to claim 13, wherein a spectral power distribution of the narrow band illumination corresponds to the at least one colorant combination used to place the watermark.

15. The method according to claim 12, wherein the narrow band illumination is an LED scanner, the peak wavelengths of the metameric pair have opposing polarities, wherein at least one of a sum and a difference of the peak wavelengths are used to increase strength of signal associated with the decoded watermark.

16. The method according to claim 12, wherein the watermark strength for the metameric pair is calculated as $|Y_1-Y_2|$, where $Y_1=\int R_1(\lambda) \times S(\lambda) \times V(\lambda) d\lambda$ and $Y_2=\int R_2(\lambda) \times S(\lambda) \times V(\lambda) d\lambda$, where $R_1$ and $R_2$ are the spectral reflectances of the metameric pair, S is the spectral power distribution of the narrow band illumination, and $V(\lambda)$ is the spectral luminous efficiency function.

17. The method according to claim 13, wherein the narrow band illumination can be tuned or varied to vary the wavelength of light emitted to reveal one or more disparate colorant combinations.

18. The method according to claim 13, wherein information is extracted from the watermark subsequent to the reveal of the watermark via the narrow band illumination.

19. The method according to claim 13, wherein selection of the at least one metameric colorant combination utilized to place the watermark and the image is based upon the bandwidth of the narrow band illumination.

20. A method for generating a printed watermark, comprising:

selecting at least one colorant mixture/pattern for printing;

deriving a second colorant mixture/pattern with the property of appearing substantially similar to the first mixture/pattern under broadband illumination, but distinct from the first mixture/pattern under a selected visible narrow band illumination; and printing the two colorant mixtures/patterns in close spatial proximity to produce a watermark that is concealed under broadband illumination and revealed under the visible narrow band illumination.

* * * * *